(12) United States Patent
Wissenbach et al.

(10) Patent No.: US 11,768,641 B2
(45) Date of Patent: Sep. 26, 2023

(54) OUTSOURCING PRINT JOBS WITH PRINT JOB RECIPES

(71) Applicant: Hewlett-Packard Development Company, L.P., Spring, TX (US)

(72) Inventors: Paul Wissenbach, Boise, ID (US); Scott C. Clouthier, Boise, ID (US); Shaun Patrick Henry, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/774,678

(22) PCT Filed: Nov. 14, 2019

(86) PCT No.: PCT/US2019/061442
§ 371 (c)(1),
(2) Date: May 5, 2022

(87) PCT Pub. No.: WO2021/096513
PCT Pub. Date: May 20, 2021

(65) Prior Publication Data
US 2022/0391155 A1    Dec. 8, 2022

(51) Int. Cl.
*G06F 3/12*    (2006.01)
(52) U.S. Cl.
CPC .......... *G06F 3/1238* (2013.01); *G06F 3/1208* (2013.01); *G06F 3/1222* (2013.01); *G06F 3/1257* (2013.01); *G06F 3/1273* (2013.01); *G06F 3/1288* (2013.01)

(58) Field of Classification Search
None
See application file for complete search history.

(56) References Cited

U.S. PATENT DOCUMENTS

| | | | |
|---|---|---|---|
| 7,190,478 B2 | 3/2007 | Caffary, Jr. et al. | |
| 7,804,611 B2 | 9/2010 | Castellani | |
| 7,855,796 B2 | 12/2010 | Kitada | |
| 8,988,713 B2 | 3/2015 | Gutnik et al. | |
| 9,996,388 B1 | 6/2018 | Khafizova | |
| 2007/0146772 A1* | 6/2007 | Castellani | G06K 15/02 358/1.15 |
| 2008/0297830 A1* | 12/2008 | Sewell | H04N 1/32529 358/1.15 |
| 2010/0165376 A1 | 7/2010 | Matsuyama | |
| 2012/0224204 A1* | 9/2012 | Yamagishi | G06K 15/4065 358/1.13 |
| 2012/0314248 A1* | 12/2012 | Zhou | G06F 3/126 358/1.15 |

(Continued)

FOREIGN PATENT DOCUMENTS

KR    10-2017-0062682 A    6/2017

*Primary Examiner* — Thomas D Lee (57) ABSTRACT

In one example in accordance with the present disclosure, a system is described. The system includes an outsourcing engine to select a contracting print device to which a print job is to be outsourced. A recipe generating engine of the system generates a recipe for a print job. The recipe includes 1) settings for the print job and 2) settings for the contracting print device that is to generate the print job. The system also includes an encoder to encrypt the recipe and an exception processor to respond to requests from the contracting print device to deviate from the recipe.

15 Claims, 6 Drawing Sheets

(56) References Cited

U.S. PATENT DOCUMENTS

2014/0268211 A1* 9/2014 Zhou ............... G06F 3/1275
  358/1.15
2018/0143792 A1  5/2018 Chau et al.

* cited by examiner

OUTSOURCING PRINT JOBS WITH PRINT JOB RECIPES

BACKGROUND

Printing refers to the formation of text, images, and/or other patterns on a substrate such as paper. A print job refers to a file, or set of files, that is to be printed. For example, a print job may be to print a certain amount of copies of a book or other publication.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

As described above, printing refers to the operations of forming text and/or images on a substrate, such as paper. In many cases, customers engage printing companies to print large print jobs and specialty print jobs. For example, a publisher may engage a printing company to print an edition of a book. In some examples, the books themselves may be large, when compounded with the large number of copies to print, it is easy to see how a print job can involve hundreds of thousands, if not millions, of pages of printed content.

In many cases, a print company may receive multiple print jobs, and in particular many of these large print jobs. To fulfill the print jobs, one print company may outsource the production of a print job to a contractor that can produce the print job. For example, Company A may have too many other jobs to process, such that they cannot meet customer commitments. In this example, Company A may send a particular print job to Company B who may have the time and bandwidth to print the job on time for Company A. That is, as a print shop grows and takes on more orders than it can fulfill, it may outsource the work in order to meet printing deadlines and avoid losing customers. The print jobs may be outsourced to other print shops that have the same or similar output devices.

While such outsourcing helps to ensure that print jobs are processed timely and eases the burden placed on a particular print company, there is no ability for an outsourcing company to automatically outsource the jobs and job configuration in a way to ensure it is printed the same way by the contracting print devices of a separate entity. That is, when outsourcing a print job, there may be no way to ensure that the job will be printed with the identical quality and configuration requested by the customer and to the specification were the job to be printed using Company A's resources. Today the outsourcing process is very manual and includes emailing or uploading job files and the number of copies.

Moreover, in some cases, a print job relies on the use of resources and information that the outsourcing company desires to keep confidential. For example, such things as fonts, color profiles, impositions, etc. may be valuable to a company and they may be reluctant to distribute this information, even to reputable print companies.

In general, a print company, Company A, would manually contact another printing company, Company B to aide in the printing of a print job. The vetting process may include large amounts of time getting the output from the Company B printers to match the output from Company A printers. Obviously, this may be a time-consuming process involving multiple cycles of back and forth between Company A and Company B.

In other cases, the back-and-forth to match output quality is not followed and an outsourcing print company just outsources a print job without ensuring the quality or parity with regards to its own work. For example, Company A may qualify a print company who has similar print equipment, similar quality standards, similar finishing and similar shipping standards/collaborations. Then as overflow work conditions occur, Company A simply hands off the overflow work to the second print company, Company B. Company B would then print and ship the job and Company A would assume the work would meet their expectations. Clearly using this method, the outsourcing company, Company A, would have no way to guarantee the quality of their work to the customer.

Accordingly, the present specification describes an automated method for outsourcing print jobs between print shops. Specifically, along with the print job, the system transmits a recipe which includes configuration information for all of the print resources used to fulfill the job.

In one particular example, the present specification describes a method of outsourcing print jobs between multiple companies using a remote outsourcing system. In this example, the jobs are outsourced based on an outsourcing agreement. An encrypted job recipe is transmitted to the printing device to produce the outsourced work from a secure repository. In some examples, the system audits the outsourced job to optimize the desired printing provided by the contracting printing devices. In other words, the present specification describes a system and method for outsourcing of print jobs with explicit configurations to ensure printing adheres to a particular configuration and the printing quality will be the same as if the job were printed in-shop.

As a specific example, Company A and Company B have an agreement and Company A selects a job for outsourcing. The print job itself and the job's rendering, printing, and device configuration information are automatically transferred from a secure repository to Company B as a job recipe. The specified configurations may be automatically installed and the job is printed on Company B's selected outsourcing device(s) as if it had been printed on a Company A device.

In some examples, the present systems and methods, take into account the differences in Company A's print devices and Company B's print devices. Accordingly, the present system and methods facilitate the increased throughput of print devices.

Specifically, the present specification describes a system. The system includes an outsourcing engine to select a contracting print device to which a print job is to be outsourced. The system also includes a recipe generating engine to generate a recipe for a print job. The recipe includes settings for the print job and settings for the contracting print device that is to generate the print job. The system also includes an encoder to encrypt the recipe and an exception processor to respond to requests from the contracting print device to deviate from the recipe.

The present specification also describes a method. According to the method, a recipe for a print job is created. As described above, the recipe includes settings for the print job and settings for a contracting print device that is to generate the print job. The recipe for the print job is encrypted and transmitted to a secure repository accessible by an agent associated with the contracting print device.

The present specification also describes a non-transitory machine-readable storage medium encoded with instructions executable by a processor. The machine-readable storage medium includes instructions to generate an encrypted recipe for a print job. The encrypted recipe includes settings for the print job and settings for a contracting print device that is to generate the print job. The machine-readable storage medium also includes instructions to transmit the encrypted recipe to a secure repository, generate an outsourcing agreement for the print job, and responsive to generating the outsourcing agreement, authorize the contracting print device to access and download the encrypted recipe from the secure repository. The machine-readable storage medium also includes instructions to authorize a request from the contracting print device to deviate from the recipe.

As used in the present specification and in the appended claims, the engine may include various hardware components, which may include a processor and memory. The processor may include the hardware architecture to retrieve executable code from the memory and execute the executable code. As specific examples, the controller as described herein may include computer readable storage medium, computer readable storage medium and a processor, an application specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the engines cause the engines to implement at least the functionality of outsourcing a recipe for a print job as described below.

Such devices and systems 1) facilitate outsourcing of print jobs; 2) ensure the print job is printed according to specific configuration information; 3) enforces restrictions that limit the ability to modify configuration or job settings; 4) manage requests for job changes; and 5) track the print job and printing.

Figure 1:
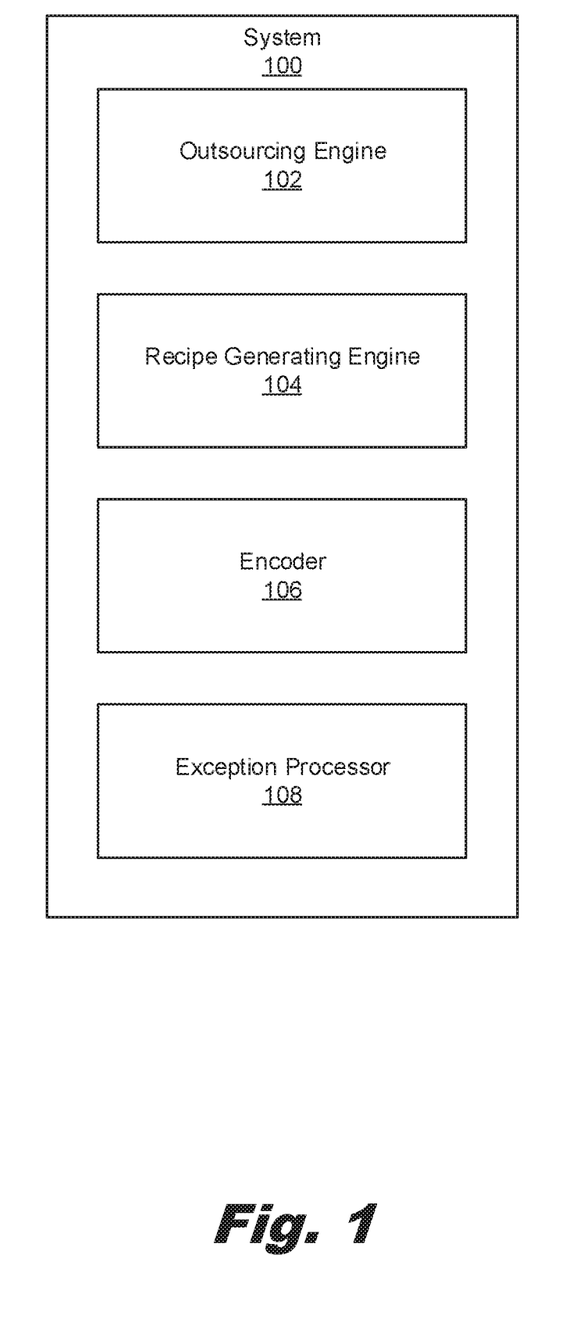
FIG. 1 is a block diagram of a system for outsourcing print jobs and print job recipes, according to an example of the principles described herein.

Turning now to the figures, FIG. 1 is a block diagram of a system (100) for outsourcing print jobs and print job recipes, according to an example of the principles described herein. The system (100) includes an outsourcing engine (102) to select a contracting print device to which a print job is to be outsourced. That is, as described above, when a particular printing company, for whatever reason, desires to outsource a particular print job, or a portion of a print job, the outsourcing engine (102) selects the print company, and associated print devices that will be used to carry out the printing of that print job.

In some examples, the selection of the contracting print device may be based on user input. For example, a user may identify in the system the contracting printing devices that will receive the print job and the print recipe. This user input may be via an outsourcing agreement, which also may be established by the system (100). In other examples, the selection of a contracting print device may be based on a database of existing print devices, with a device being selected based on the characteristics of the particular print device and certain rating criteria.

The system (100) also includes a recipe generating engine (104) to generate a recipe for a print job. As used in the present specification and in the appended claims, the term "recipe" refers to the settings for the print job and the settings for the contracting print device that is to generate the print job. That is, a customer may define how they want a completed print job to look, and may even specify certain criteria such as substrate type, color tones, etc.

As a particular example, the recipe may include an imposition. An imposition specifies the layout of a print job. This may be a simple layout of 1-up with some crop marks or a complex imposition where multiple copies of the print job are arranged in a specified manner to maximize how they fit on the page. This may be used to reduce waste, or to arrange the pages for finishing so that the front and back pages are printed in the correct order according the type of finishing applied. In another example, the recipe may include a substrate specification indicating a type of substrate, and/or substrate properties to be used to form the print job.

As yet another example, the recipe may include workflow routing. In one example, workflow routing specifies processing stages in greater detail or processing stages to skip (for example if imposition or color management is done upstream). In some examples, the workflow routing may indicate specific finishing instructions such as finishing equipment, such as what type of raster image processor (RIP) to use, what press to use, etc. The workflow routing may also indicate shipping instructions such as packaging instructions, shipping addresses, etc. Another example is a that the routing could include a hold before print for a manual approval stage.

As yet another example, the recipe may include a font specification and/or a color profile which defines a color space used for printing. As further examples, the recipe may indicate resources to be used to generate the print job, other job settings, contracting print device settings, restrictions, and allowed modifications. For example, a user may place restrictions on the print job such as the number of times the print job can be printed, whether a review stage is requested prior to printing, the calendar date range within which the print job can be printed, and whether the print job and/or print job recipe is automatically deleted, among other actions.

As yet another example, the recipe may include a lookup table. A color lookup table (LUT) is a mechanism used by the printing device for color conversion through a fast lookup table to convert or adjust colors. This may be used to translate and adjust color output to compensate for printing device characteristics that vary from printing device to printing device. It may be a linear or non-linear adjustment and may be applied to rendered device colorant data (CMYK for example) on a per channel basis.

While specific reference is made to certain features of a print job recipe, the recipe may include any type of information that is used in producing a print job, such as a print count, etc.

In some examples, the recipe may be unique to a print job. That is, the recipe may be formed as a customer or contracting entity pre-processes the print job. In this example, a customer may customize a recipe from scratch or may start with a template.

In other examples, the recipe may be selected from a database. For example, the system (100) as will be described below, in some examples may include a secure repository that among other things, stores recipes. Accordingly, a user may select either a template recipe and if desired may edit some of the characteristics of the template recipe as desired.

The system (100) may also include an encoder (106) to encrypt the recipe. That is, the recipe may include certain information that a customer and or outsourcing print company desires to maintain secure. Accordingly, the encoder (106), by encoding this information ensures that confidential information is kept as such, thus protecting certain proprietary information of either the customer or the outsourcing print company. In some examples, the encoder (106) may also encode the print job itself.

The system (100) may include an exception processor (108) to respond to requests from the contracting print device to deviate from the recipe. That is, in some cases, a contracting print device may desire to deviate from the original recipe in order to produce the print job. For example, during printing, waste runs are common. Accordingly, due to any number of circumstances, the contracting print device may request additional print counts to account for waste runs. In another example, the contracting print device may include different hardware such as different print presses. Accordingly, the contracting print device may request an exception such that the print job may be printed notwithstanding the different print press.

The exception processor (108) responds to such requests. In some examples, the exception processor (108) may generate an automatic response to the request. For example, Company A may specify parameters for the print job and allow Company B to modify those parameters as an exception in order to facilitate efficient production of the job without modifying the output intent. As a particular example, suppose Company A outsources a print job to Company B, but Company B uses a different press, or they use the same press as Company A, but that press is undergoing maintenance and is not available for operation. Accordingly, an exception request may be submitted and the exception processor (108) may either automatically or manually approve/disapprove the request.

For example, exceptions may be automatically approved within guidelines set by Company A. Examples of exceptions that may be automatically approved include items such as printing device type used or imposition, where the selection may not have a large effect on the final output. As a specific example, Company B may incur job waste when printed copies were damaged during finishing. In this example, Company B may request to be able to print more copies than were authorized by Company A in the outsourcing request. In this example, Company B may describe the situation and request the right to print additional copies. In this example, the exception processor (108) may log the request and automatically approve the request to print additional copies.

In another example, the exception processor (108) generates a prompt for a user response to the exception request. That is, certain exceptions may request specific user approval to authorize. Exceptions that trigger manual override by Company A may include items such as substrate type and number of copies. For example, Company B may run out of the specific substrate stock during an outsourced print run. Company B may request an exception to use a different substrate to finish the order. Company B logs the request and Company A is notified and can manually approve/reject the exception request.

In either case, i.e., automatic or manual approval/disapproval, the exception processor (108) may generate a notification of a received request as well as the generated response to the request. The notifications of an exception request may be presented in real-time, that is as the request is made, or may be at another point in time, such as in a completion record which is generated as the print job is finished. Whether or not an exception is subject to automatic or manual approval may be designated in the recipe.

Accordingly, the present system (100) facilitates control over printing for which a first entity may have responsibility for, but not the capacity to produce. Put one way, the present system (100) provides for the automatic transformation of a Company B printing device to proxy print outsourced jobs for Company A. This system (100) is flexible in that it provides automatic approval of some exceptions, and audit of exceptions, to enable Company B to optimize production of outsourced work from Company A all while keeping Company A abreast of what is occurring. Thus, the system (100) provides for the outsourcing and the exact replication of a print job with a specific print job recipe.

In other words, the present system (100) enables automated and programmatic outsourcing of jobs and the ability to specify and get the exact replication of job and job configuration settings as though Company A were printing the job themselves and also provides the ability to audit and track the jobs and see progress and to restrict access to any or all parts of the job to change.

Such a system (100) allows for greater similarity in print jobs, or portions of print jobs, that are printed on different devices and in some cases in different locations.

Figure 2:
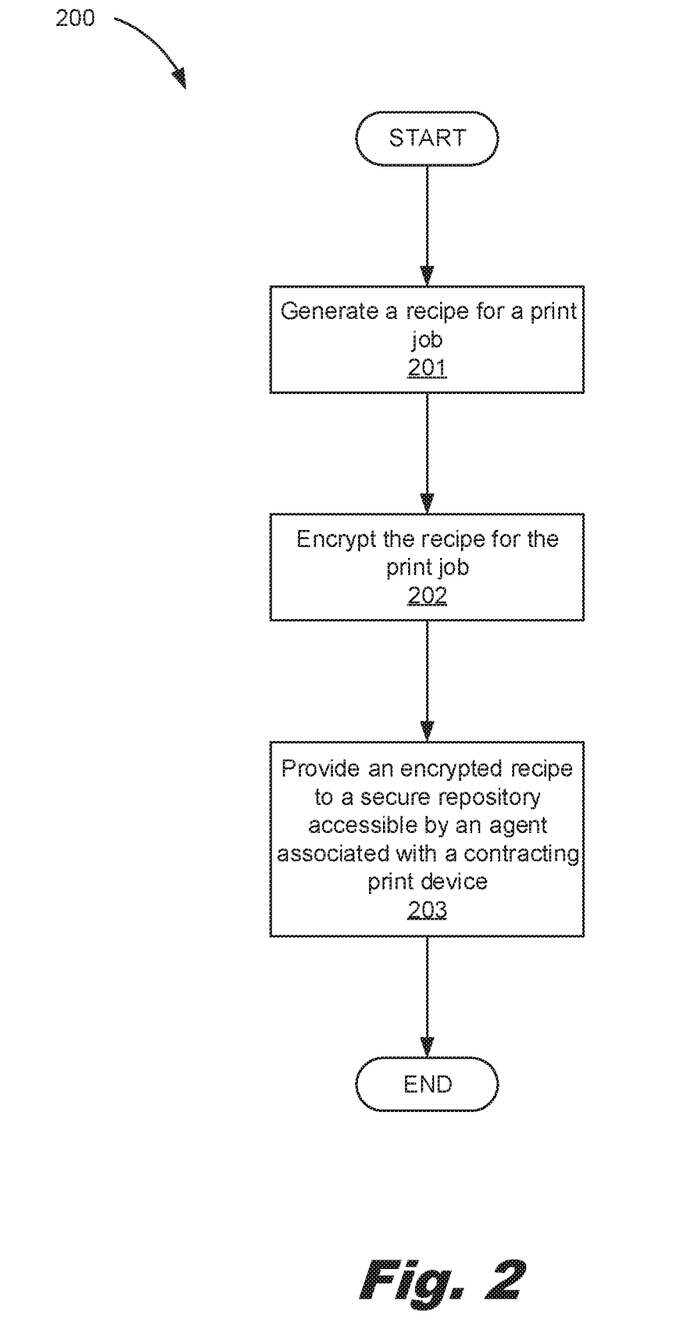
FIG. 2 is a flow chart of a method for outsourcing print jobs and print job recipes, according to an example of the principles described herein.

FIG. 2 is a flow chart of a method (200) for outsourcing print jobs and print job recipes, according to an example of the principles described herein. According to the method (200), a recipe may be generated (block 201). As described above, a recipe refers to any combination of print settings and print device settings used to generate the print job. In some examples, when generating a print job, a first company that is outsourcing the print job verbally communicates with a second company that is receiving the outsourced print job regarding what the finished product is intended to look like. In this process, a number of test runs by the print devices of the second company may be executed to ensure the print job looks as the first company intends. However, such a process may be time intensive with a lot of back-and-forth to finalize the look of the print job. Accordingly, by generating (block 201) the specific characteristics used to generate the print job, and transmitting those along with the print job, this back-and-forth correspondence is minimized. Moreover, by ensuring that the print job recipe is transmitted along with the print job, the system (FIG. 1, 100) ensures that regardless of the device that prints the job, the print device generates an output as intended such that the resulting print job matches certain job specifications selected by the customer and/or first company.

Generation (block 201) of the recipe may come in a variety of forms. For example, it may be prior to generation of the print job itself. That is, a customer or an administrator of the first printing device may select certain settings used to print a print job and may pass those to the system (FIG. 1, 100) which generates the recipe.

In another example, the recipe is generated (block 201) during production of a portion of the print job. That is, in generating a portion of the print job, a printing device may operate with certain settings. Throughout this process, the settings used to generate the print job with the desired settings may be saved and combined into the recipe.

In another example, the recipe may be selected from a recipe repository. That is, a database may house a corpus of recipes based on historic use or which may be template recipes. The recipe generating engine (FIG. 1, 104) may extract one of these recipes based on user input, characteristics of the print job that match characteristics of historic print jobs, or any number of other criteria.

The encoder (FIG. 1, 106) may then encrypt (block 202) the recipe for the print job, and in some examples the print job itself, and the recipe may be transmitted (block 203) to a secure repository that is accessible by an agent associated with the contracting print device. In other words, in some examples, the encrypted recipe is not transmitted directly to the contracting print device, but rather to a secure repository where control over the recipe is maintained. From there the agent of the contracting print device may access the encrypted recipe.

Figure 3:
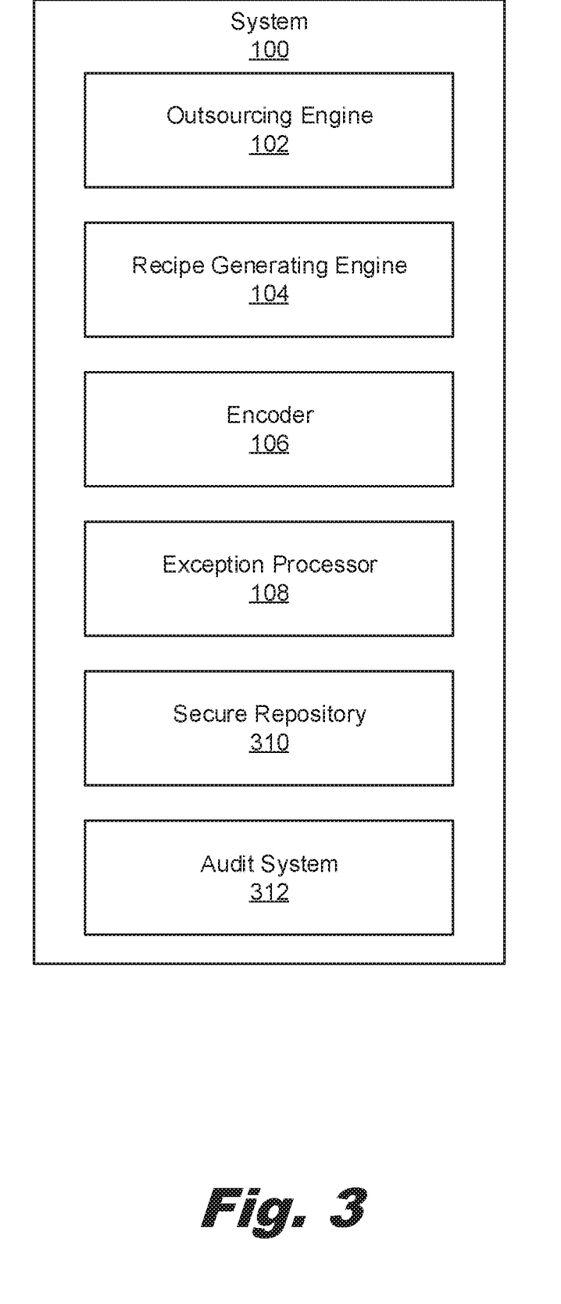
FIG. 3 is a block diagram of a system for outsourcing print jobs and print job recipes, according to another example of the principles described herein.

FIG. 3 is a block diagram of a system (100) for outsourcing print jobs and print job recipes, according to another example of the principles described herein. As described above, the system (100) includes an outsourcing engine (102), a recipe generating engine (104), an encoder (106), and an exception processor (108) as described above in connection with FIG. 1. In the example depicted in FIG. 3, the system (100) includes other components. For example, the system (100) may include a secure repository (310) to store a number of encrypted recipes. That is, once a recipe is created for a print job, it may be uploaded and stored to the secure repository (310). The secure repository (310) being accessible to the contracting print device, provides a secure location whether the recipe may be downloaded from, or referenced when printing the outsourced print job. That is, as will be described below, in some examples the contracting print device may download the recipe and in other cases the contracting print device may simply reference the recipe, while the recipe remains on the secure repository (310).

The secure repository (310) ensures the security of the information stored thereon. For example, the recipe may include certain proprietary information such as color profiles, that a company outsourcing work may not want viewed by the contracting entities, for example to prevent against misappropriation of the information contained therein. Accordingly, the secure repository (310) allows the contracting print devices to produce the print jobs, without seeing the recipe that is used to produce the print job.

This secure repository (310), by storing the recipes in an encrypted format, prevents a receiving print company from using the assets for jobs outside of the outsource agreement. As a particular example, Company A may spend large amounts of money developing specific color management profiles that uniquely identify their company. This secure repository (310) allows Company A to outsource jobs and job recipes to Company B without fear that Company B can use the information contained in the recipe outside of the agreement for their own work and revenue generation. In some examples, the recipe in the secure repository (310) and the print job itself may be associated one with another. That is, the secure repository (310) may stores the recipe and may be updated to know that a specific print job relates to that recipe and that access has been granted to the associated recipe.

In some examples, the secure repository (310) may be remote from a computing device on which the rest of the system (100) is disposed. For example, the secure repository (310) may be housed on a remote secure server. In another example, the secure repository (310) may be on the computing device that houses the other components of the system (100). In either case, the secure repository (310) may allow access to the recipe to the contracting print device, all while protecting the information stored thereon.

In some examples, the system (100) includes an audit system (312) to generate notifications based on data transmitted by an agent associated with the contracting print device. That is, the contracting print device may include an agent that, among other things, implements a recipe. That is, the agent may include hardware components that, without exposing the recipe to a user of the computing device, decodes the recipe and implements it to produce the print job assigned to the contracting printing device.

In addition to this functionality, the audit system (312) may record the print settings and contracting print device settings that were used to generate the print job. That is, the agent audits all outsourcing activity and reports back to the audit system (312) to ensure the integrity of the outsourcing process between Company A and Company B. The audit system (312) report provides Company A with visibility of the printed jobs as though they were printing in the Company A shop. In some examples, these reports on the work being done may be real-time, i.e., during the printing of the print job, or upon the completion of a job. Doing so provides greater transparency into the outsourcing operations. For example, this allows Company A to utilize some file control mechanism to select jobs for outsourcing and to track the jobs such that both Company A and Company B can see the queue of work that has been outsourced.

The audit system (312) may also record exception requests that were submitted as well as responses to those requests. For example, as described above, the contracting print device may request exceptions be made to the recipe such that the print job may still be processed, albeit with slight modifications to the original recipe. Each such request for exception, along with whether the request was automatic/manually responded and whether the request was approved/disapproved, may be stored in a database. This may be used to automatically generate an outsourcing agreement in the future. For example, if a company that receives the outsourced print job is likely to request exceptions when generating a print job, this may be a factor against using that particular company in subsequent outsourcing projects.

Figure 4:
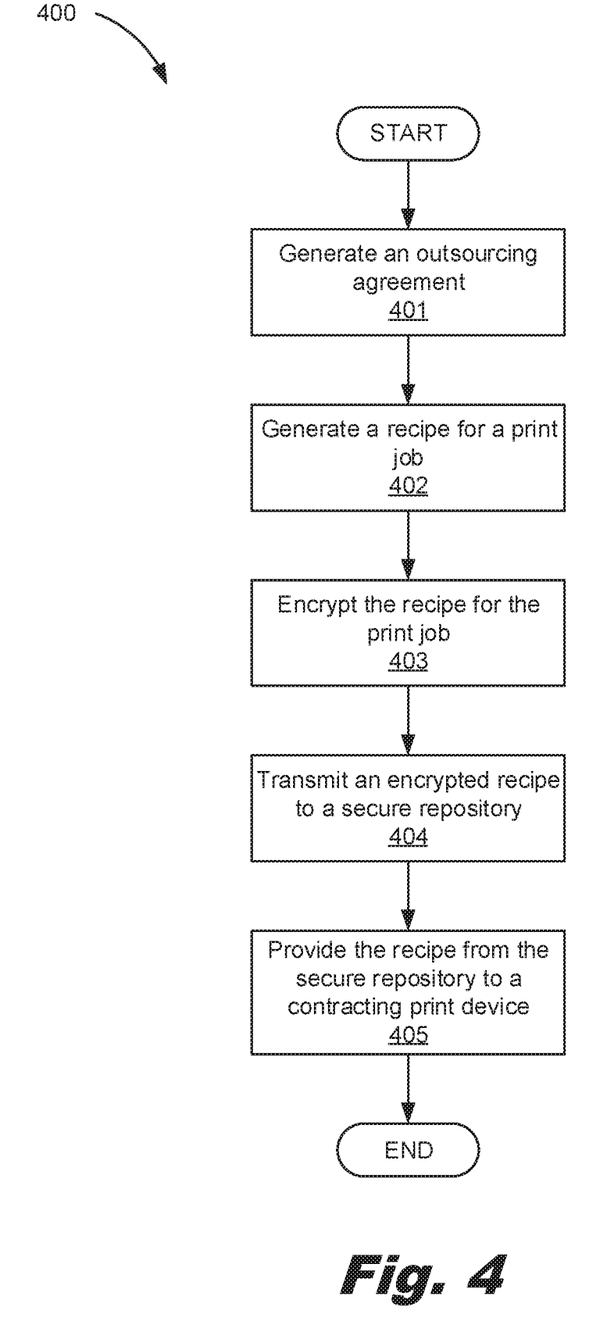
FIG. 4 is a flow chart of a method for outsourcing print jobs and print job recipes, according to an example of the principles described herein.

FIG. 4 is a flow chart of a method (400) for outsourcing print jobs and print job recipes, according to an example of the principles described herein. According to this example, an outsourcing agreement is generated (block 401) for the print job. The outsourcing agreement establishes the base level permissions that enable setting up an outsourcing relationship. Such an agreement may include basic terms of the arrangement such as quantity, price, and may be an initial check to verify that the contracting print device has the capacity and capability to complete the print job per the terms set forth in the outsourcing agreement.

Either before, after, or during generation (block 401) of the outsourcing agreement, a recipe for the print job is generated (block 402) and encrypted (block 403) as described above in connection with FIG. 2 and transmitted (block 404) to the secure repository.

In some examples, upon approval of the outsourcing agreement, the recipe is provided (block 405) from the secure repository (310) to the contracting print device. That is, as described above, the agent which may be installed on the contracting print device may download the recipe from the secure repository (FIG. 3, 310) or the contracting print device may simply reference the recipe while printing the print job. In some examples, when the print job is terminated, or after a set period of time when it is expected that the print job would be completed, access to the recipe may be revoked. For example, it may be in the terms of the outsourcing agreement that the print job is to be terminated by a certain date. Once that date comes, the access rights of the contracting print device to the recipe may be revoked. Additionally, such a revocation may occur at any point in time, for example in the case that exception thresholds have been exceeded or due to a failure to process the print job in line with the recipe.

Figure 5:
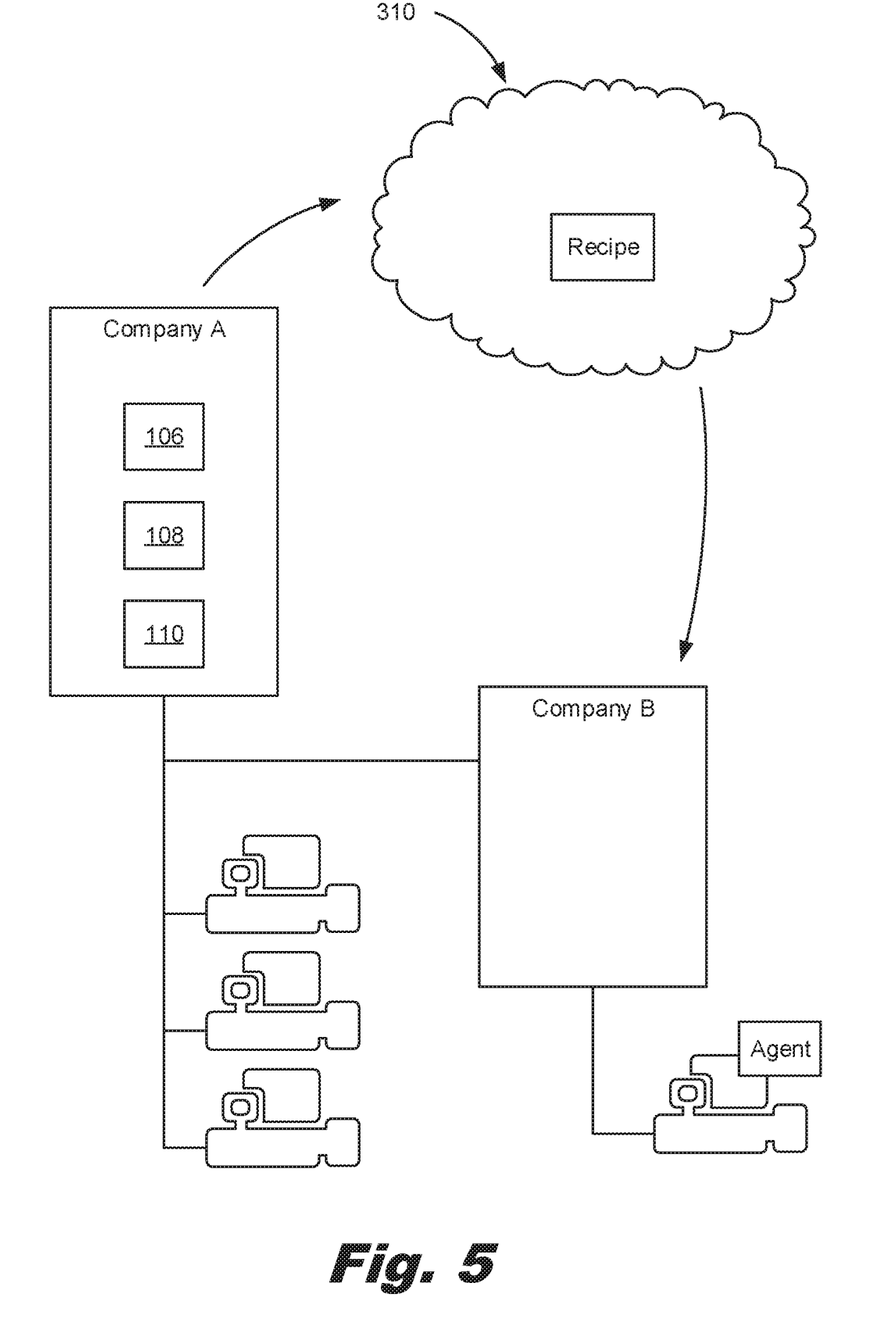
FIG. 5 is a diagram of an environment for outsourcing print jobs and print job recipes, according to an example of the principles described herein.

FIG. 5 is a diagram of an environment for outsourcing print jobs and print job recipes, according to an example of the principles described herein. As described above, it may be the case that Company A is contracted to produce a print job for a client. For any variety of reasons, Company A may desire to outsource the print job to Company B. FIG. 5 depicts an environment to effectively distribute the print job such that Company B printing devices produce the print job so that the resulting output from Company B printing devices are the same as the resulting output from Company A printing devices.

Accordingly, in this example, Company A generates a recipe, encodes it, and transmits the recipe to a secure repository (310), which in the example depicted in FIG. 5 is remote from the other components (106, 108, 110) of the system (FIG. 1, 100). Once Company B is selected and approved via the creation of an outsourcing agreement, Company B is granted access to the recipe, either via downloading or simple reference to the recipe on the secure repository (310). Note that in this example, the recipe is inaccessible to any other of Company B computing devices outside of the printing device. Doing so ensures the security and inaccessibility of the recipe by Company B from potential misappropriation.

This recipe, when installed on a different device, transforms the device to behave as if it was the original device when printing a job that references the recipe. The recipe containing the exact rendering, printing and device configurations is automatically transferred and installed from the cloud to specific Company B devices.

Either via the secure repository (310) or another mechanism, the print job is also sent to the contracting printing device of Company B and the contracting printing device executes the print job to product the contracted print job or portion of the print job.

To carry out such printing, the printing device of Company B may have an agent installed thereon. The agent operates to provide enforcement, security, and the ability of Company A to automatically transform the Company B device into a proxy Company A device. Enforcement entails ensuring security of the outsourcing process and compliance to all restrictions. Specifically, such an agent sits in front of the printing device and limits visibility of the detailed recipe and associated settings and components as well. For example, a contracting print device may include a raster image processor (RIP). In general, the RIP accesses a color profile from a file system. However, in this case, the agent would be modified to access the file from the secure repository and not from disk.

In particular, the agent, in the example depicted in FIG. 5, accesses the secure repository (310) and downloads an encrypted recipe associated with the print job. The agent enforces the recipe during processing of the print job and tracks processing of the print job. Either during printing or upon completion of the print job, the agent transmits data relating to the processing of the print job to a job owner.

In some examples, the agent converts the recipe between owner printing device specifications to contracting print device specifications. That is, it is likely that Company A has different printing devices than Company B. This alone however may not preclude Company B printing devices from generating the print job as if they were printed using Company A devices. However, there may be conversion of the data, for example to a different protocol, to ensure that regardless of the difference, Company B printing devices can generate a similar print job. The agent thereby may convert the print settings or printing device settings to ensure replication of the print job as desired.

Figure 6:
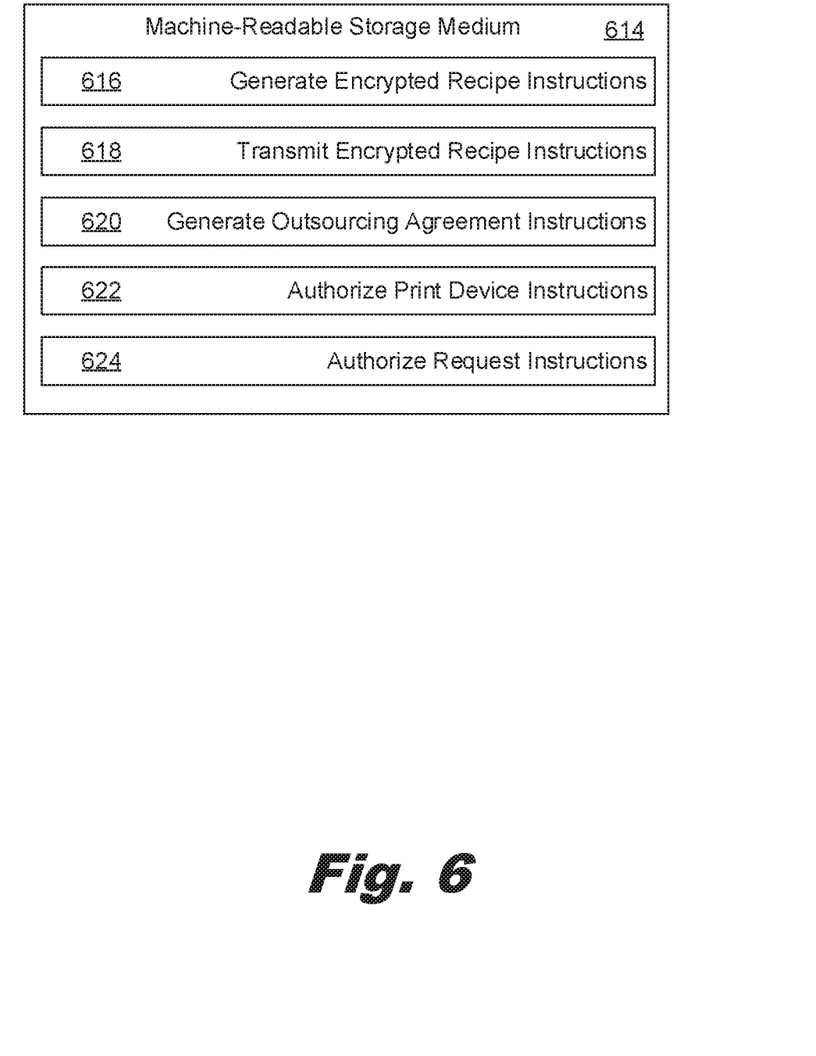
FIG. 6 depicts a non-transitory machine-readable storage medium for outsourcing print jobs and print job recipes, according to an example of the principles described herein.

FIG. 6 depicts a non-transitory machine-readable storage medium (614) for outsourcing print jobs and print job recipes, according to an example of the principles described herein. To achieve its desired functionality, a computing system includes various hardware components. Specifically, a computing system includes a processor and a machine-readable storage medium (614). The machine-readable storage medium (614) is communicatively coupled to the processor. The machine-readable storage medium (614) includes a number of instructions (616, 618, 620, 622, 624) for performing a designated function. The machine-readable storage medium (614) causes the processor to execute the designated function of the instructions (616, 618, 620, 622, 624).

Referring to FIG. 6, generate encrypted recipe instructions (616), when executed by the processor, cause the processor to generate an encrypted recipe for a print job. The encrypted recipe includes settings for the print job and settings for a contracting print device that is to generate the print job. Transmit encrypted recipe instructions (618), when executed by the processor, cause the processor to transmit the encrypted recipe to a secure repository (FIG. 3, 310). Generate outsourcing agreement instructions (620), when executed by the processor, may cause the processor to generate an outsourcing agreement between a contracting print device to be proxy for a job owner and the job owner. Authorize print device instructions (622), when executed by the processor, may cause the processor to, responsive to generating the outsourcing agreement, authorize the contracting print device to access and download the encrypted recipe from the secure repository. Authorize request instructions (624), when executed by the processor, may cause the processor to authorize a request from the contracting print device to deviate from the recipe.

Such devices and systems 1) facilitate outsourcing of print jobs; 2) ensure the print job is printed according to specific configuration information; 3) enforces restrictions that limit the ability to modify configuration or job settings; 4) manage requests for job changes; and 5) track the print job and printing.

What is claimed is:

1. A system, comprising:
    an outsourcing engine to select a contracting print device to which a print job is to be outsourced;
    a recipe generating engine to generate a recipe for a print job, which recipe comprises:
        settings for the print job; and
        settings for the contracting print device that is to generate the print job;
    an encoder to encrypt the recipe; and
    an exception processor to respond to a request from the contracting print device to deviate from the recipe.

2. The system of claim 1, further comprising a secure repository to store a number of encrypted recipes.

3. The system of claim 1, wherein the exception processor is to generate a notification of a received request and a generated response to the request.

4. The system of claim 1, wherein the exception processor is to generate an automatic response to the request or generate a prompt for a user response to the request.

5. The system of claim 1, further comprising an audit system to generate a notification based on data transmitted by an agent associated with the contracting print device.

6. The system of claim 5, wherein the audit system is to revoke access of the agent to the recipe.

7. The system of claim 1, wherein the recipe comprises at least one of:
    an imposition;
    a substrate specification;
    a workflow routing;
    a font specification;
    a color profile;
    an indication of resources used to generate the print job;
    job settings;
    contracting print device settings;
    allowed modifications; and
    a lookup table.

8. A method, comprising:
    generating a recipe for a print job, wherein the recipe comprises:
        settings for the print job; and
        settings for a contracting print device that is to generate the print job;
    encrypting the recipe for the print job; and
    transmitting an encrypted recipe to a secure repository accessible by an agent associated with the contracting print device.

9. The method of claim 8, further comprising:
    generating an outsourcing agreement for the print job; and
    upon approval of the outsourcing agreement, providing the recipe from the secure repository to the contracting print device.

10. The method of claim 8, wherein the agent:
    accesses the secure repository;
    downloads the encrypted recipe associated with the print job;
    enforces the recipe during processing of the print job;
    tracks processing of the print job; and
    transmits data relating to the processing of the print job to a job owner.

11. The method of claim 8, wherein the agent converts the recipe between owner print device specifications to contracting print device specifications.

12. The method of claim 8, wherein the recipe is inaccessible outside of the contracting print device.

13. The method of claim 8, wherein generating a recipe for a print job comprises at least one of:
    generating the recipe prior to generation of the print job;
    generating the recipe from print settings during production of a portion of the print job; and
    selecting the recipe from a recipe repository.

14. A non-transitory machine-readable storage medium encoded with instructions executable by a processor, the machine-readable storage medium comprising:
    instructions to generate an encrypted recipe for a print job, wherein the encrypted recipe comprises:
        settings for the print job; and
        settings for a contracting print device that is to generate the print job;
    instructions to transmit the encrypted recipe to a secure repository;
    instructions to generate an outsourcing agreement for the print job;
    instructions to, responsive to generating the outsourcing agreement, authorize the contracting print device to access and download the encrypted recipe from the secure repository; and
    instructions to authorize a request from the contracting print device to deviate from the recipe.

15. The non-transitory machine-readable storage medium of claim 14, wherein the recipe is unique to the print job.

* * * * *